June 11, 1940.  R. H. BROCKMAN  2,204,295
DENTAL PULP TESTER
Filed Nov. 29, 1938  2 Sheets-Sheet 1

Inventor
R. H. Brockman
By Mason Fenwick & Lawrence
Attorneys

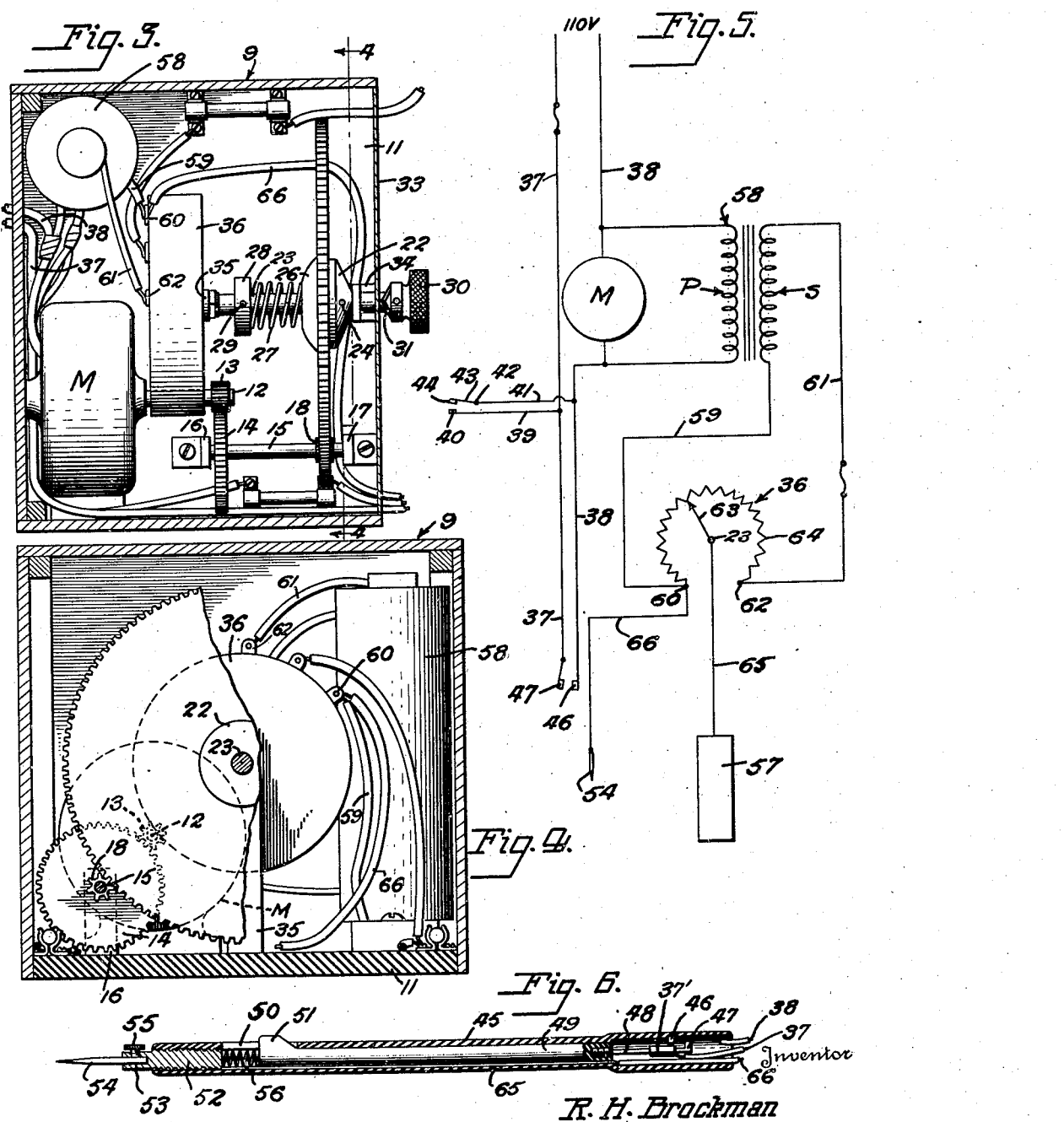

Patented June 11, 1940

2,204,295

UNITED STATES PATENT OFFICE 2,204,295

DENTAL PULP TESTER

Robert H. Brockman, St. Petersburg, Fla.

Application November 29, 1938, Serial No. 243,002

4 Claims. (Cl. 128—2.1)

This invention relates generally to dental appliances; and more particularly, to such dental appliances as are used in examining teeth to determine the condition of the underlying nerve or pulp.

Sometimes the nerve of a tooth dies, even when the tooth is apparently sound, without giving any external indication of its condition. A dead nerve in a tooth may cause abscesses in the bone structure of the jaw at the end of the root of the tooth. Abscesses of this character may not cause any local pain or give any external indication of their presence, and yet may cause a continuous formation of pus which is absorbed into the system and may give rise to various ailments such as rheumatism, kidney disease, heart disease, etc.

It is the main object of the present invention to provide a pulp testing instrument by means of which a dentist may determine very readily whether degeneration of the nerve of a tooth has set in, and the extent of such degeneration.

Another object of the invention is to provide a pulp testing instrument by means of which the relative extent of nerve degeneration, as compared with a sound tooth, may be indicated visually.

Other objects of the invention will become apparent as the detailed description thereof proceeds.

In the drawings:

Figure 3 is a horizontal section taken on the line 3—3 of Figure 2;

Figure 4 is a vertical section taken on the line 4—4 of Figure 3;

Figure 5 is a wiring diagram;

Figure 6 is a longitudinal section through an electrode-probe adapted to be applied to a tooth undergoing test;

Figure 1:
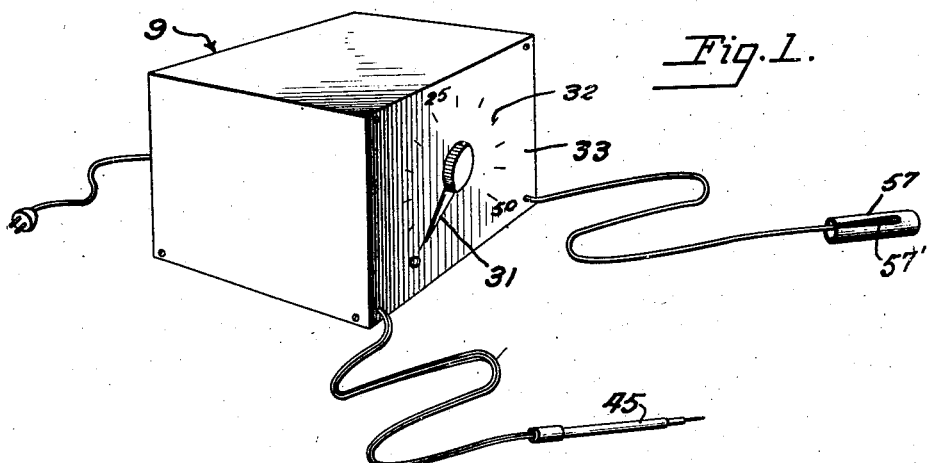
Figure 1 is a perspective view of the pulp tester with most of the operating parts enclosed in a casing.
Figure 2:
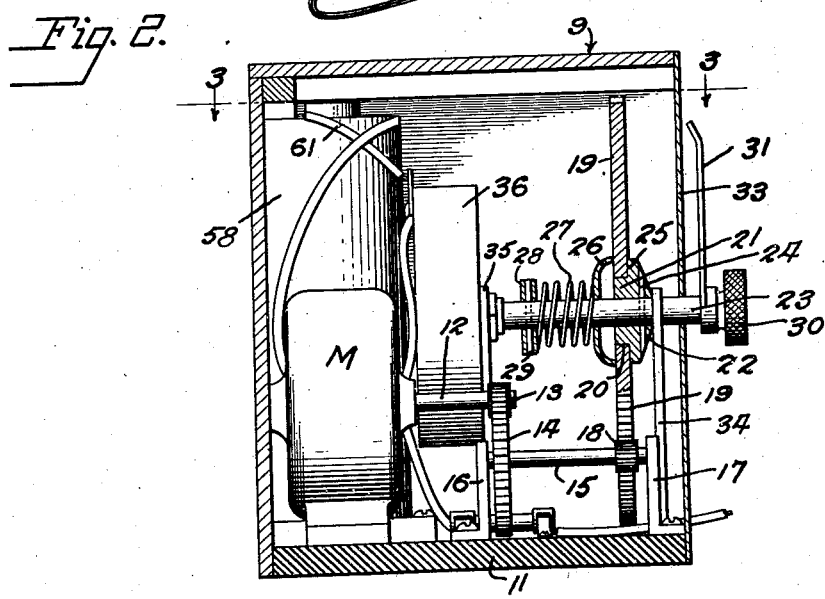
Figure 2 is an end elevation of the operating mechanism of the tester with a side wall of the casing removed and with parts illustrated in vertical section.

As shown in the drawings, the invention includes a casing 9 in which is enclosed substantially all of the moving parts of the mechanism. A motor M, suitably secured to the base 11 of the casing, has its rotor shaft 12 provided with a pinion 13 meshing with a spur gear 14 suitably secured to a shaft 15 journalled at its opposite ends in bearing brackets 16 and 17 suitably secured to the base 11. A pinion 18, secured to the shaft 15, meshes with a large gear 19 which is provided at its center with a circular aperture 20 rotatably receiving a cylindrical projection 21 formed on a collar 22 which is fixed to a shaft 23 by means of a pin 24 passing through registering apertures in the said collar 22 and shaft 23.

The cylindrical projection 21 forms on the collar 22 an annular shoulder 25 against which the large gear 19 is frictionally clamped by means of a cupped washer 26 mounted on the shaft 23 and contacting frictionally with one side of the gear 19. A compression spring 27 surrounds the shaft 23 and is interposed between the washer 26 and a collar 28 secured to the shaft 23 by means of a pin 29 passing through registering apertures formed in the said shaft 23 and collar 28.

A knurled handle 30 is suitably secured to the outer end of the shaft 23 and has an indicator 31 extending radially therefrom to rotate over a voltage scale 32 formed on the front wall 33 of the casing 9. The shaft 23 is journalled on bearing brackets 34 and 35 suitably secured to and extending upwardly from the base 11, and extends into the casing of a potentiometer designated generally by the reference numeral 36.

Electric current for the motor M and the other parts of the instrument is derived from the mains 37 and 38. A wire 39, tapped to the main 37, is connected to a fixed contact 40; and a wire 41 connects the main 38 to the terminal 42 of a spring switch 43 provided at its outer end with a contact 44 adapted to be moved by the foot of the operator into contact with the fixed contact 40 to close the circuit across the mains 37 and 38.

The instrument includes a handle comprising a tube 45 in which is fixed a contact 46 electrically connected to one end of the main 38. The other main 37 is electrically connected through a sleeve 37' to a contact 47 projecting from the end of a rod 48 suitably secured in one end of an insulating member 49 slidably mounted in the tubular handle 45. This handle 45 is provided with a slot 50 through which projects a lug 51 extending laterally from the member 49 and through said slot to be engaged by the thumb of the operator.

A metallic plug 52, screw-threaded into the end of the tube 45 remote from the contact 46 and 47, is provided with a bore 53 in which a suitable conducting probe 54 may be detachably secured by means of the set screw 55. A coil spring 56 interposed between the inner end of the plug 52 and the enlarged end of the member 49 maintains said member 49 normally in position to hold the contacts 46 and 47 yieldingly separated from each other. It will be obvious that said contacts 46 and 47 may be moved into contact with each other by pressure of the thumb of the operator upon the lug 51 against the yielding resistance of the spring 56. It will also be apparent then that the motor M may be started either by the foot of the operator pressing upon the spring switch 43, or by the hand of the operator pressing against the projecting lug 51 to close the circuit of the motor through the contacts 46 and 47.

The metallic plug 52 and the probe 54 together constitute one of two electrodes upon which the operation of the device depends. The other electrode 57 is a metallic cylinder designed to be held in a hand of the patient on whom the instrument is used. Current for the electrodes 45 and 57 is supplied from the mains 37 and 38 through a transformer 58 and the potentiometer 36. The transformer primary P is shunted on the main around the motor M and the transformer secondary S is connected at one end by a wire 59 to a terminal 60 of the potentiometer 36. The other end of the secondary is connected by a wire 61 to the other terminal 62 of the potentiometer 36.

The shaft 23 has a wiper arm 63 secured thereto within the potentiometer casing to rotate over the potentiometer coil 64; and this shaft 23 is electrically connected by wires 65 to the electrode 57. The terminal 60 of the potentiometer is electrically connected by wire 66 extending lengthwise through the tubular handle 45 of the probe-electrode into contact with the metallic plug 52. The wiper arm 63 and the indicator 31 are fixed to the shaft 23 in such manner that when the indicator 31 is set to the zero division on the scale 32, the end of the wiper arm will be located over the terminal 60 of the potentiometer.

The scale 32 is preferably divided into fifty divisions, each of which represents roughly one volt, so as to give the operator a definite guide in comparing the relative sensitivities of the teeth undergoing test. Because of the frictional connection between the shaft 23 and the large gear 19, it will be obvious that the shaft 23 may be rotated manually in either direction to any desired position on the scale 32. Of course, it is understood that this frictional connection is sufficient to cause the shaft 23 to be rotated around the scale 32 under control the motor M through the reducing gearing connecting the rotor shaft 12 with the gear 19.

Teeth for testing may be roughly divided into several classes: First—normal teeth, that is, teeth having no fillings and apparently unblemished. Second—teeth that are unblemished, but which are for some reason painful. Third—teeth with fillings. Fourth—worn teeth. Fifth—dead teeth; that is, teeth from which the pulp has been removed by a dentist, or in which the pulp has died either from mechanical or chemical or thermal irritation. Of course, there are other classifications; but generally an experienced operator by using the pulp tester described herein can arrive at a good understanding as to the relative health of the nerve in any tooth.

In operating the machine, the patient is seated. Then the tooth to be tested is cleaned and dried cotton rolls are applied around it and, if necessary, rubber or celluloid strips are placed interproximally between it and the adjacent teeth. The patient then grasps the hand electrode 57, and the operator applies the other electrode 54 to the tooth at a point which he decides will give the best reaction. The operator then presses the projecting lug 51 against the spring 56 to bring the contact 47 into contact with the contact 46 and close the circuit through the motor.

When the motor M is in operation, its rotor shaft 12 transmits its rotation through the intervening reduction gearing to the potentiometer shaft 23. The current increases as the potentiometer arm and the indicator 31 rotate, respectively, around the potentiometer coil 64 and the scale 32. When sufficient voltage has been applied to the tooth by this operation to give a reaction, the operator releases the pressure on the lug 51 to stop the motor. Releasing the lug 51, of course, stops the entire mechanism so that no shock is felt by the patient beyond the first slight irritation, which may be the reaction from a normal tooth.

If the tooth is sub-normal or dead, the voltage can be carried to a much higher point before the patient experiences any irritation, due to the passage of current through the tooth; and then it manifests itself at the hand electrode or in the tissues around the tooth. If a tooth has a filling and the electrode is applied to it, and the tooth is alive or vital, the stimulation is felt at a much lower voltage. Obviously, this is due to the fact that the filling (if a metallic one) conducts the current nearer the pulp and offers much less resistance to the current than the normal tooth structure would offer so that the irritation is felt at a lower potential or voltage. In the case of a tooth in which the nerve for some reason is hyper-sensitive, or more sensitive than normal, a response to the current is obtained at a much lower voltage.

Figure 7:
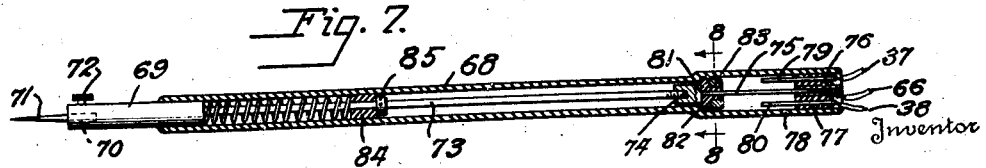
Figure 7 is a longitudinal central section, to a modified form, of the electrode-probe shown in Figure 6.
Figure 8:
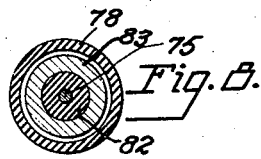
Figure 8 is a section taken on the line 8—8 of Figure 7.

The modification of the probe-electrode illustrated in Figures 7 and 8 comprises a tube 68 of insulating material in which is slidably mounted a metallic plug 69 provided with a bore 70 in which a conducting probe 71 is detachably secured by the set screw 72. The plug 69 is turned down to form a rod 73 of smaller diameter extending axially of the tube 68. The end of the rod 73 remote from the plug 69 is screw-threaded for connection to an enlargement 74 on the inner end of a conducting rod 75 slidably mounted in a conducting sleeve 76 fixed in a non-conducting plug 77 inserted in the outer enlarged end 78 of the tube 68. Conducting pins 79 and 80 extend through this non-conducting plug 77 into the space in the enlarged end 78 around the rod 75. The conducting sleeve 76 is connected by the wire 66 to the potentiometer terminal 60; and the conducting pins 79 and 80 are connected, respectively, to the main wires 37 and 38. The enlargement 74 has a shoulder 81 seating an insulating collar 82 provided with an annular rabbet in which is seated a conducting ring 83 adapted to make electrical contact with the pins 79 and 80 when the tube 68 is moved lengthwise of the plug 69 toward the probe 71. To secure the probe normally in open circuit position, a collar 84 is suitably secured to the inside of the tube 68 and a stop 85 is secured to the rod 73 to contact with the collar 84 and limit the outward movement of the probe with respect to its supporting tube 68. A compression spring is arranged between the adjacent ends of the plug 69 and the collar 84 to maintain the probe in the projected position shown in Figure 7 of the drawings and with the stop 85 normally against the collar 84. It will be obvious from this construction that the circuit through the motor M and transformer 58 is closed by the operator pressing the probe 71 against the tooth to be tested to move the pins 79 and 80 into contact with the conducting ring 83.

While I have shown the electrode 57 as a metallic cylinder adapted to be held in the hand of the patient or to be clamped against the patient's hand by means of the spring clamp 57', it is to be understood that this description and illustration is merely for convenience in disclosure. The invention is obviously intended to be used by applying the electrode 57 to any available and suitable part of the patient's body. Therefore, in such claims as the second electrode is referred to as "adapted to be held in the hand" of a patient, it must be understood that this is merely a convenient way of stating that the second electrode may be held or otherwise applied to any other part of the human body.

What I claim is:

1. A tooth nerve testing instrument comprising a hollow handle, an electrically conducting probe mounted therein, a single conductor electrically connected to the probe and adapted to constitute one terminal of a secondary electrical circuit, a pair of conducting terminals mounted in insulated relation to each other within the handle and adapted to constitute a switch in a primary electrical circuit, and a movable element enclosed by the handle to open and to close the primary circuit across the pair of terminals, the probe being movable longitudinally within the handle, an abutment fixed to the interior walls of the handle, a spring fastened between the probe and the abutment, a rod extending from the probe to the vicinity of the primary terminals and carrying a conductor adjacent the terminals and adapted to close the primary terminals when the probe is moved into the handle, and a transformer having primary and secondary circuits connected with the tooth testing instrument and means in the primary circuit and actuated by the primary current to alter the secondary circuit voltage.

2. A tooth nerve testing instrument comprising a hollow handle, an electrically conducting probe mounted therein, a single conductor electrically connected to the probe and adapted to constitute one terminal of a secondary electrical circuit, a pair of conducting terminals mounted in insulated relation to each other within the handle and adapted to constitute a switch in a primary electrical circuit, and a movable element enclosed by the handle to open and to close the primary circuit across the pair of terminals, and, exterior to the handle and connected therewith, a primary circuit and a secondary circuit interconnected by a transformer, variable resistance in the secondary circuit, and means operated by flow of current in the primary circuit to vary the secondary resistance continuously when the primary circuit is closed.

3. A tooth nerve testing instrument comprising a hollow handle, an electrically conducting probe mounted therein, a single conductor electrically connected to the probe and adapted to constitute one terminal of a secondary electrical circuit, a pair of conducting terminals mounted in insulated relation to each other within the handle and adapted to constitute a switch in a primary electrical circuit, an element movable within the handle to open and to close the primary circuit across the pair of terminals, and, exterior to the handle and connected therewith, a primary circuit, and a secondary circuit interconnected by a transformer, variable resistance in the secondary circuit and means operated by flow of current in the primary circuit to vary the secondary resistance continuously when the secondary resistance is closed, and a foot switch in the primary circuit in parallel with the terminals in the handle of the testing instrument.

4. A tooth nerve testing instrument comprising a hollow handle, an electrically conducting probe mounted therein, a single conductor electrically connected to the probe and adapted to constitute one terminal of a secondary electrical circuit, a pair of conducting terminals mounted in insulated relation to each other within the handle and adapted to constitute a switch in a primary electrical circuit, and a movable element enclosed by the handle to open and to close the primary circuit across the pair of terminals, and exterior to the handle and connected therewith, a primary circuit and a secondary circuit interconnected by a transformer, variable resistance in the secondary circuit, and a motor operated by flow of current to vary the secondary resistance continuously when the primary circuit is closed.

ROBERT H. BROCKMAN.